Oct. 2, 1945.　　　　F. JUDGE　　　　2,385,922
DIE HOLDER
Filed Feb. 3, 1944
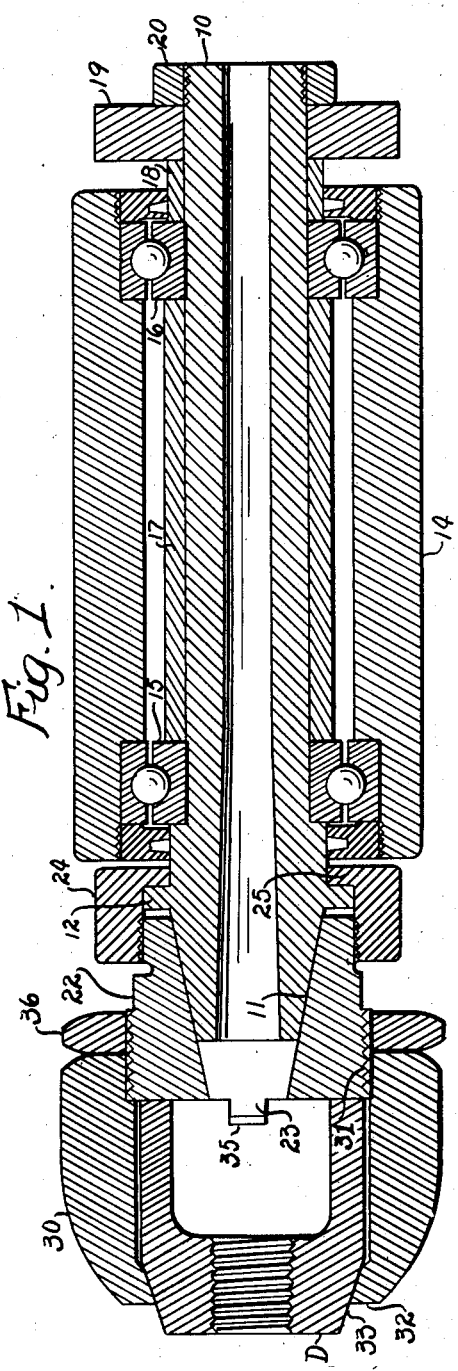
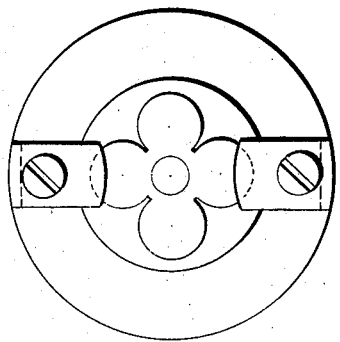
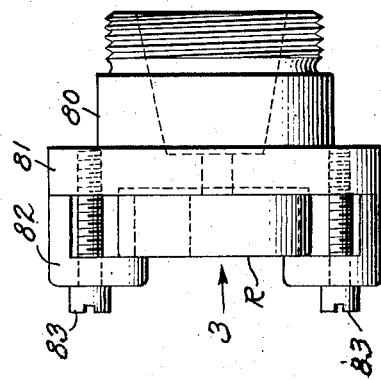
INVENTOR.
Franklin Judge.
BY ATTORNEY Patented Oct. 2, 1945

2,385,922

UNITED STATES PATENT OFFICE 2,385,922

DIE HOLDER

Franklin Judge, Greenfield, Mass.

Application February 3, 1944, Serial No. 520,917

3 Claims. (Cl. 10—119)

This invention relates to means for securing a die or other similar object on the end of a rotated spindle.

It is the general object of my invention to provide improved devices for such purposes, so constructed that a die may be firmly but detachably secured to the end of a driving spindle and in accurate alignment therewith.

A preferred form of the invention is shown in the drawing, in which

Fig. 1 is a sectional side elevation of my improved die holder;

Fig. 2 is a modified construction adapted to hold round dies; and

Fig. 3 is an end view, looking in the direction of the arrow 3 in Fig. 2.

Referring to Fig. 1, I have shown my invention as adapted for securing an acorn die D to the end of a spindle 10 having a conical driving portion 11 and an adjacent flange 12. The spindle 10 may be rotatably supported in a bearing 14 in any convenient manner, as by ball bearings 15 and 16, the inner races of which are secured to the spindle 10 by sleeves 17 and 18, disc 19 and a clamping nut 20. The specific construction of the bearing forms no part of my invention.

In order to secure the die D in driving engagement with the spindle 10, I provide a bushing 22 tapered to fit the conical end 11 of the spindle 10 and having a driving rib 23 extending diametrically across its outer end. At its rear end, the bushing is threaded to receive a clamping collar 24 having an inner flange 25 engaging the flange 12 of the spindle 10. By tightening the collar 24, the bushing 22 will be firmly seated on the conical spindle end 11.

An annular die holder or sleeve 30 is threaded to engage the threaded outer end 31 of the bushing 22. At its left-hand end, as shown in Fig. 1, the holder 30 has a conical inner surface 32 adapted to engage a corresponding conical outer surface 33 of the acorn die D. The die also has a diametral slot or recess 35 fitting the rib 23 on the bushing 22.

By screwing the holder 30 firmly on the bushing 22, the die will be accurately centered in driving engagement on the end of the bushing 22, which in turn is firmly seated and accurately aligned with respect to the spindle 10. A lock nut 36 may be provided to retain the holder 30 in clamping position.

With this construction, an acorn-type die may be quickly and easily secured to the end of a conical driving spindle, and grinding or other desired operations may be performed on the die D.

In Figs. 2 and 3, I have shown a type of die holder 80 which may be substituted for the holder 22 in Fig. 1 and which may be similarly retained on the conical end of a driving spindle by a clamping collar like the collar 24. The holder 80 is provided with an integral outer disc 81 against which a round die R may be seated and firmly retained by clamping lugs 82 and clamping screws 83. The outer face of the disc 81 may be recessed to receive and center the die R.

Having shown and described my improved die holder, it will be seen that I have provided very simple means for accurately securing an acorn type die or a round type die on the end of a driving spindle. In all forms of the invention, the die is accurately centered and firmly held, regardless of the type of spindle on which it mounted.

Having thus described my invention and the advantages thereof, I do not wish to be limited to the details herein disclosed, otherwise than as set forth in the claims, but what I claim is:

1. Means to secure a die to a spindle having a conical driving projection and an external annular flange adjacent said projection, which means comprises a die-engaging member, a threaded and internally-flanged collar coacting with the external flange on said spindle and with a threaded portion of said member to seat said member on said conical projection, and means to seat the die against an end surface of said member.

2. Means to secure a die to a spindle having a conical driving projection and an external annular flange adjacent said projection, which means comprises a die-engaging bushing, a threaded and internally-flanged collar coacting with the external flange on said spindle and with a threaded portion of said bushing to seat the bushing on said conical projection, and a sleeve threaded on said bushing and effective to clamp the die against an end surface of said bushing.

3. Means to secure a die to a spindle having a conical driving projection and an external annular flange adjacent said projection, which means comprises a die-engaging bushing, a threaded and internally-flanged collar coacting with the external flange on said spindle and with a threaded portion of said bushing to seat the bushing on said conical projection, and clamping lugs on said bushing effective to clamp the die against an end surface of said bushing, and said end surface being recessed to receive and center the die.

FRANKLIN JUDGE.